(12) United States Patent
Venkateshaiah et al.

(10) Patent No.: US 12,373,243 B2
(45) Date of Patent: Jul. 29, 2025

(54) USING A NANOSERVICE TO INFORM AN EXTERNAL JOB SERVICE OF A JOB STATUS OF A MICROSERVICE

(71) Applicant: International Business Machines Corporation, Armonk, NY (US)

(72) Inventors: Hariprasad Venkateshaiah, Bangalore (IN); Gireesh Punathil, Bangalore (IN); Tirumalesh Killamsetty, Bangalore (IN); Sariga D, Kozhikode District (IN)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 17/668,959

(22) Filed: Feb. 10, 2022

(65) Prior Publication Data

US 2023/0251896 A1 Aug. 10, 2023

(51) Int. Cl.
*G06F 9/48* (2006.01)
(52) U.S. Cl.
CPC ............ *G06F 9/485* (2013.01); *G06F 9/4881* (2013.01)
(58) Field of Classification Search
CPC ...................................................... G06F 9/485
See application file for complete search history.

(56) References Cited

U.S. PATENT DOCUMENTS

| | | | |
|---|---|---|---|
| 11,954,521 B2 | 4/2024 | Lin et al. | |
| 2010/0325642 A1* | 12/2010 | Paramasivam | G06F 11/0757 719/317 |
| 2017/0111455 A1* | 4/2017 | Raju | H04L 67/141 |
| 2021/0011762 A1 | 1/2021 | Lin et al. | |
| 2021/0011766 A1* | 1/2021 | Kumar | G06F 9/5083 |
| 2022/0185349 A1* | 6/2022 | McGowan | G06V 10/751 |
| 2023/0401093 A1* | 12/2023 | Wang | G06F 9/52 |

FOREIGN PATENT DOCUMENTS

WO 2021013105 A1 1/2021

OTHER PUBLICATIONS

SAP, "Setting Up a Configuration Sync Job," SAP Help Portal, SAP Help Portal, 2021, 8 pages, retrieved from https://help.sap.com/viewer/0194c73837d54910a7a6759da55828b4/2111/en-US/95016ebca4e34b319f5e5f921564c1de.html?q=Setting%20Up%20a%20Configuration%20Sync%20Job.
Red Hat, "Running tasks in pods using jobs," Red Hat, OpenShift, 2022, 16 pages, retroieved from https://docs.openshift.com/container-platform/4.1/nodes/jobs/nodes-nodes-jobs.html.

(Continued)

*Primary Examiner* — Charlie Sun
(74) *Attorney, Agent, or Firm* — Zilka-Kotab, P.C.

(57) ABSTRACT

A computer-implemented method according to one embodiment includes determining, using a nanoservice in a first cluster, whether a microservice of a second cluster has restarted. In response to a determination that the microservice has restarted, an external job service is informed about the restart of the microservice and a job associated with the microservice is caused to be reset. A computer program product according to another embodiment includes a computer readable storage medium having program instructions embodied therewith. The program instructions are readable and/or executable by a computer to cause the computer to perform the foregoing method.

20 Claims, 8 Drawing Sheets

(56) References Cited

OTHER PUBLICATIONS

AWS Amazon, "Call Amazon EKS with Step Functions," AWS Step Functions, Sep. 2021, 12 pages, retrieved from https://docs.aws.amazon.com/step-functions/latest/dg/connect-eks.html.
QNAP, "Hybrid Backup Sync," QNAP, Sep. 2021, 17 pages, https://www.qnap.com/en-in/software/hybrid-backup-sync.
Wikipedia, "Job (computing)," Wikipedia, 2021, 2 pages, retrieved from https://en.wikipedia.org/wiki/Job_(computing)#:~:text=In%20computing%2C%20a%20job%20is,as%20in%20a%20job%20stream).&text=Jobs%20that%20have%20finite%20input,complete%20and%20eventually%20be%20terminated.

* cited by examiner

USING A NANOSERVICE TO INFORM AN EXTERNAL JOB SERVICE OF A JOB STATUS OF A MICROSERVICE

BACKGROUND

The present invention relates to job statuses, and more specifically, this invention relates to using a nanoservice to inform an external job service of a job status of a microservice.

A job scheduler is often useful for creating periodic and recurring tasks, such as running backups, running archival based policy, or any such monotonous tasks. Some cloud deployments use a job scheduler as a service to perform repeated tasks based on a given interval or event. Generally, a job scheduler provides a specification that registers application programming interfaces (APIs) to be invoked during the different stages of a job. It is a responsibility of a microservice to keep the status of the job up to date in the job scheduler.

SUMMARY

A computer-implemented method according to one embodiment includes determining, using a nanoservice in a first cluster, whether a microservice of a second cluster has restarted. In response to a determination that the microservice has restarted, an external job service is informed about the restart of the microservice and a job associated with the microservice is caused to be reset.

A computer-implemented method according to another embodiment includes receiving, by a nanoservice of a first cluster, a notification that a predetermined event has occurred on a microservice of a second cluster. The notification is received from a cluster monitoring service. The method further includes performing a predetermined process in response to receiving the notification. The predetermined process includes comparing live data of a pod that is running on the microservice with previously stored data associated with the live data to determine whether a difference is present. In response to a determination that a difference is present in the data, the predetermined process further includes informing an external job service about the difference and causing a job associated with a pod ID of the pod having the live data to be reset.

A computer program product according to another embodiment includes a computer readable storage medium having program instructions embodied therewith. The program instructions are readable and/or executable by a computer to cause the computer to determine, by the computer, using a nanoservice in a first cluster, whether a microservice of a second cluster has restarted. In response to a determination that the microservice has restarted, an external job service is informed, by the computer, about the restart of the microservice and a job associated with the microservice is caused, by the computer, to be reset.

Other aspects and embodiments of the present invention will become apparent from the following detailed description, which, when taken in conjunction with the drawings, illustrate by way of example the principles of the invention.

DETAILED DESCRIPTION

Figure 1:
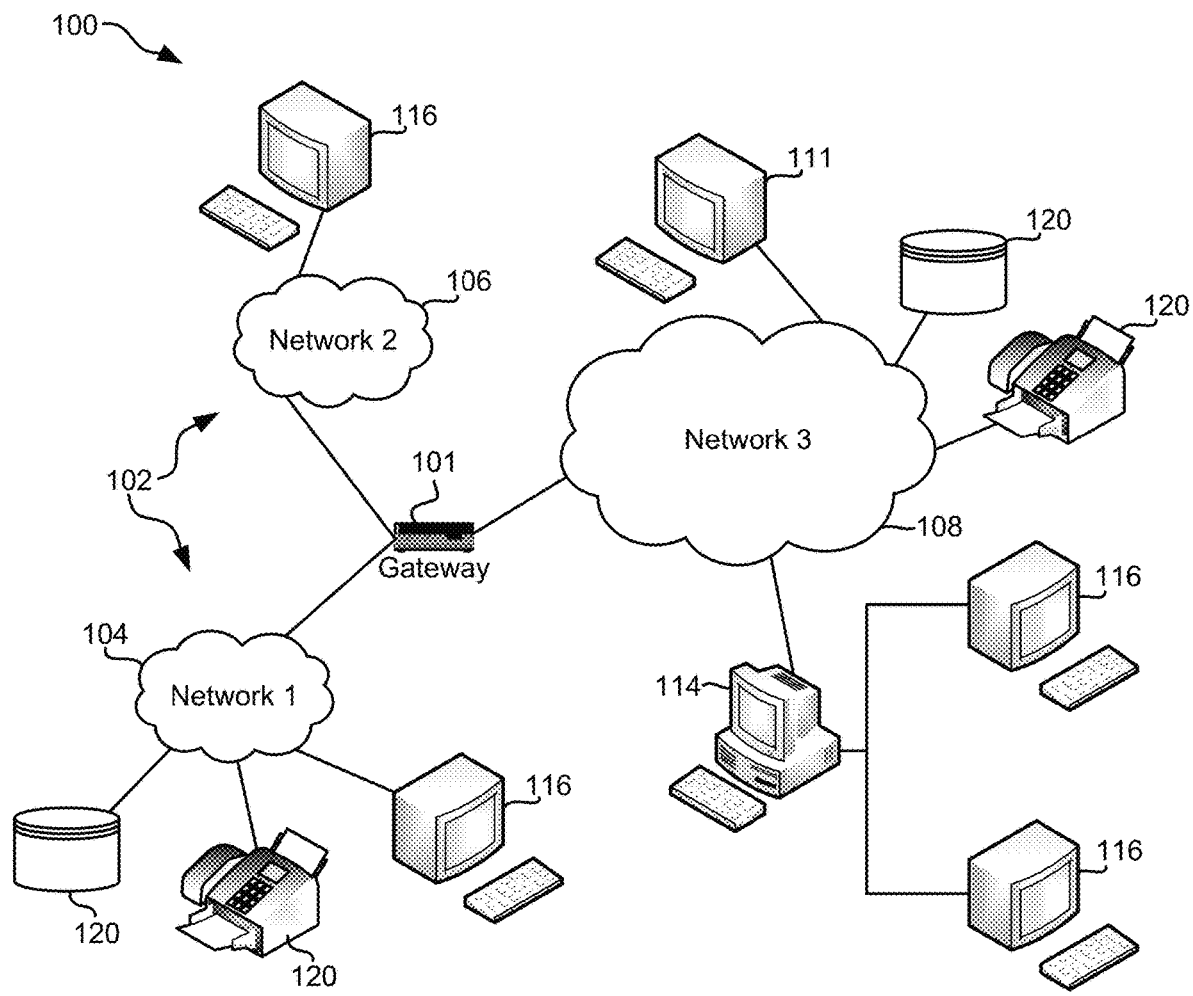
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using a nanoservice to inform an external job service of a job status of a microservice.

In one general embodiment, a computer-implemented method includes determining, using a nanoservice in a first cluster, whether a microservice of a second cluster has restarted. In response to a determination that the microservice has restarted, an external job service is informed about the restart of the microservice and a job associated with the microservice is caused to be reset.

In another general embodiment, a computer-implemented method includes receiving, by a nanoservice of a first cluster, a notification that a predetermined event has occurred on a microservice of a second cluster. The notification is received from a cluster monitoring service. The method further includes performing a predetermined process in response to receiving the notification. The predetermined process includes comparing live data of a pod that is running on the microservice with previously stored data associated with the live data to determine whether a difference is present. In response to a determination that a difference is present in the data, the predetermined process further includes informing an external job service about the difference and causing a job associated with a pod ID of the pod having the live data to be reset.

In another general embodiment, a computer program product includes a computer readable storage medium having program instructions embodied therewith. The program instructions are readable and/or executable by a computer to cause the computer to determine, by the computer, using a nanoservice in a first cluster, whether a microservice of a second cluster has restarted. In response to a determination that the microservice has restarted, an external job service is informed, by the computer, about the restart of the microservice and a job associated with the microservice is caused, by the computer, to be reset.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
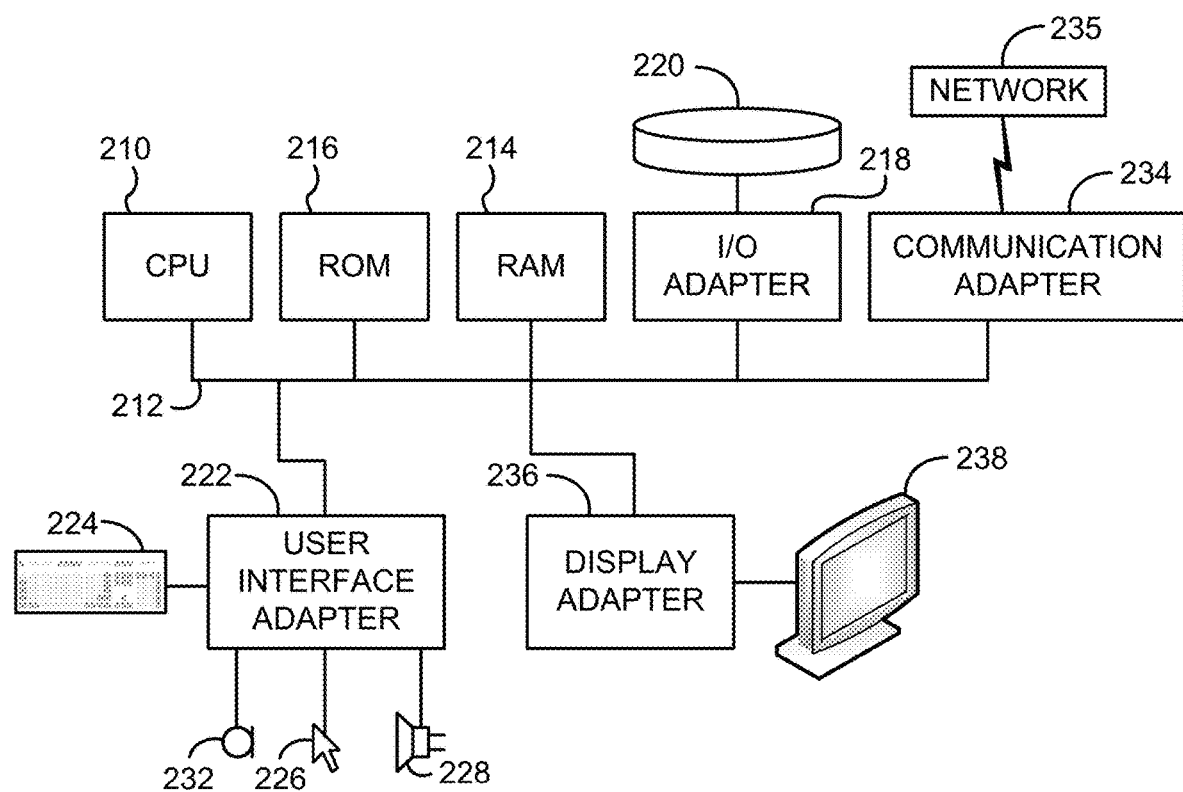
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere herein, a job scheduler is often handy for creating periodic and recurring tasks, such as running backups, running archival based policy, or any such monotonous tasks. Some cloud deployments use a job scheduler as a service to perform repeated tasks based on a given interval or the event. Generally, a job Scheduler provides a specification that registers APIs to be invoked during the different stages of a job. It is a responsibility of a microservice to keep the status of the job up to date in the job scheduler.

A microservice registers jobs that needs to be executed periodically by providing a definition to the job scheduler, which triggers a job based on the job definition. A job may be a unit of work or execution. A component of a job is called a task or a step. According to some examples, a job definition may include, e.g., a job name, a definition ID, a status, a policy, events, a start indicator, a http-verb, an endpoint, headers, a payload, etc. It is the responsibility of the microservice to update the status of the job, e.g., "InProgress," "Failure" or "Completion." System based hardware and/or software of a system architecture that includes the job scheduler may be configured to execute in tandem with the job scheduler acting as a central point for controlling different jobs in a distributed manner. More specifically, work may be queued in an abstract data structure and a job scheduler may be configured to pick-up the work, identify worker nodes for performing the jobs, e.g., based on whether or not such nodes are currently performing assigned tasks and/or completion status and/or service level agreements (SLAs), etc. Each scheduler can have a discreet set of policies or constraints as to how to schedule a task, however, a commonality of job schedulers is the responsibility of assigning tasks and controlling the life cycle of worker systems. There are cases in which a job status fails to be updated. For example, a job status may fail to be updated as a result of a microservice for a worker node that takes up work from the job scheduler becoming unavailable as soon as a job is triggered. In another example a job status may fail to be updated as a result of the microservice undergoing a restart during the job execution. This may result in the job status remaining "InProgress" which may be an initial job status set by the microservice, rather than the job status being updated as "Failed" or "Completed" by the microservice. A manual intervention may be used to fix this, however, in the meantime, the system architecture experienced reduced performance. Another example of a job status failing to be updated includes data being backed up during a job execution and the data being imported to a cloud instance. This example may result in a stale job status. Because is unlikely that the job scheduler can have more than one job in the "InProgress" state for a given service/module in a service, the job scheduler will not trigger any new jobs based on the incorrect assumption of the job scheduler about the status of the jobs. Also in this case, the microservice cannot issue a new job as one is already "InProgress." Instances of a job status failing to be updated, e.g., such as those described above, results in confusion across a container orchestration system, e.g., such as KUBERNETES, that includes the job scheduler. For example, as a result of a job status failing to be updated, a microservice will likely not know which job(s) are in invalid state. The microservice may additionally and/or alternatively fail to know that a scheduled job is from a currently running container, and not from a previously killed container. Furthermore, the microservice may fail to know jobs which belong to the previously killed container.

In sharp contrast to the deficiencies described above, various embodiments and approaches described herein include using a nanoservice to determine and inform an external job service of a job status of a microservice. Specifically, two embodiments below offer illustrative techniques for using a nanoservice to determine and inform an external job service of a job status of a microservice, e.g., see method 300 and method 500.

Figure 3A:
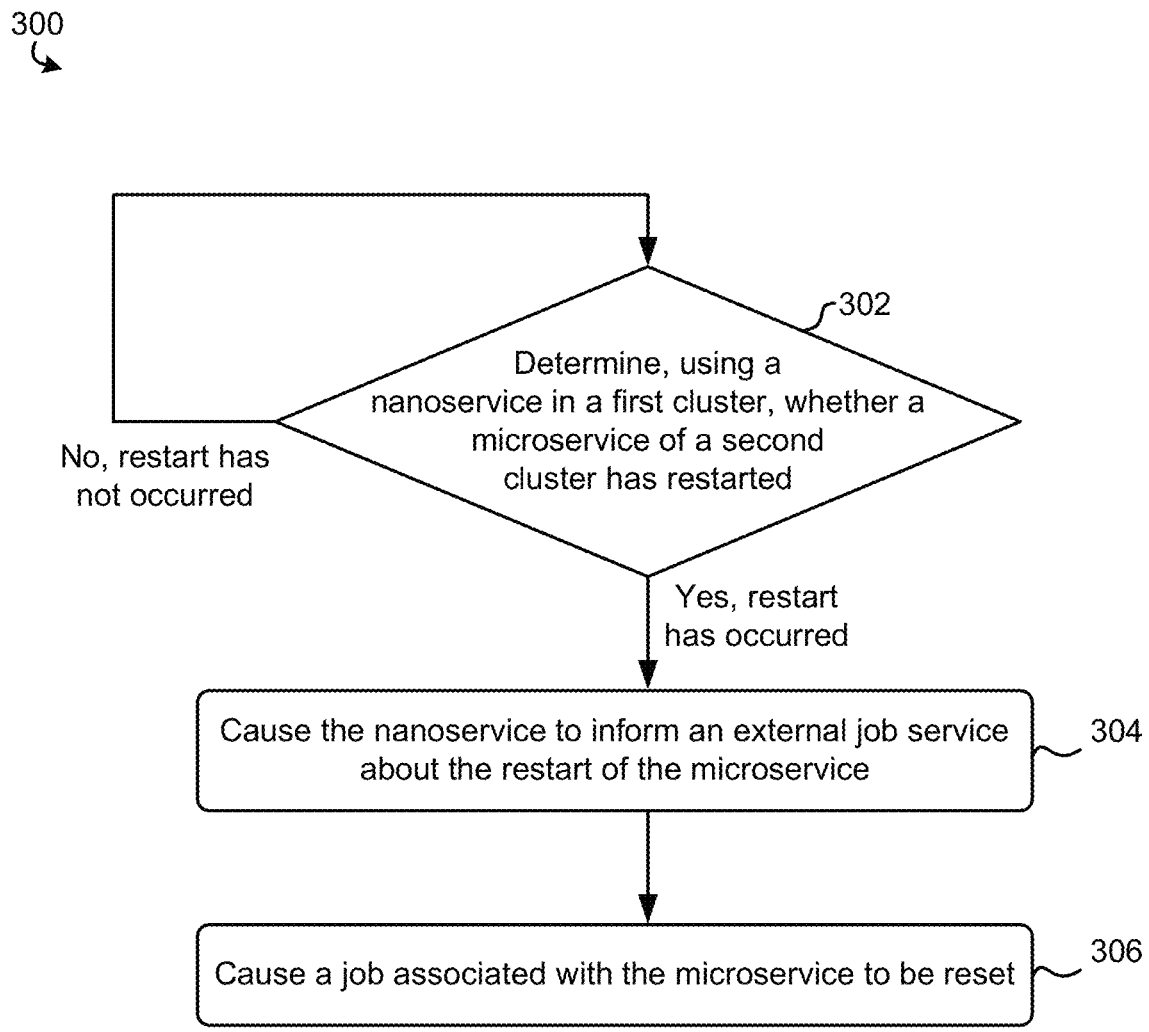
FIG. 3A is a flowchart of a method, in accordance with one embodiment.

Now referring to FIG. 3A, a flowchart of a method 300 is shown according to one embodiment. The method 300 may be performed in accordance with the present invention in any of the environments depicted in FIGS. 1-7, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

For context it may be prefaced that method 300 includes making use of pod data, e.g., pod metadata, for deciding a service internal state. More specifically, method 300 includes use of a job scheduler that is an external service. Furthermore, a microservice of a cluster is utilized as well as a nanoservice that is in a different cluster than the microservice. As will be described in method 300, the nanoservice may be in a first cluster and the microservice may be in a second cluster that is different than the first cluster. The external job service is preferably not in the first cluster and is preferably not in the second cluster. The nanoservice acts as an intermediator between the external job service and the microservice in order to handle failure scenarios that the microservice may otherwise not be able to indicate the external job service.

With continued reference to method 300, a determination is made as to whether the microservice of the second cluster has restarted, e.g., see decision 302. In one approach, the nanoservice in the first cluster may be caused to determine whether the microservice of the second cluster has restarted. The nanoservice may be a service that does not have a typical business function to execute other than the operations described herein to ensure synchronization between an actual worker service and a job scheduler is achieved and maintained, but in some approaches, the nanoservice could have other functions as well. The microservice may be of a type known in the art, and may be of a worker node. For context, in some approaches the microservice may restart as a result of one or more nodes and/or the second cluster failing. This failure may occur subsequent to a job being initiated by the microservice and before the job is completed. However, because such a failure may occur at any time, the nanoservice in the first cluster may be caused to periodically determine whether the microservice of the second cluster has restarted. For example, in some approaches the nanoservice in the first cluster may be caused to make the determination based on a timer task of the nanoservice that is running. The nanoservice may be configured to constantly check whether the microservice is up and running based on a predetermined amount of time elapsing. In another approach an instruction may be issued, e.g., by a controller that is in communication with the nanoservice, by the job scheduler, by an administrator device, etc., to the nanoservice to execute a predetermined piece of code that causes the nanoservice to make the determination in response to a predetermined amount of time elapsing. However, although decision 302 is performed with respect to a job status defined by the microservice being restarted, in some alternate approaches decision 302 may be performed with respect to another job status, e.g., determining whether a job of the microservice has been "InProgress" for more than a predetermined amount of time which may indicate that the microservice is in the process of and/or has restarted.

Various illustrative techniques for determining whether the microservice of the second cluster has restarted are described below.

In some preferred approaches, one or more predetermined types of data may be compared to determine whether the microservice of the second cluster has restarted. This is because various data metrics of the microservice, upon initially running a job, are likely to be different than the same data metrics when the microservice has experienced a failure and/or has restarted as a result of experiencing a failure event. In order to enable such a data comparison to be performed, in some preferred approaches method 300 may include keeping, e.g., generating, storing, maintaining, etc., a map that includes at least first data about jobs being run on pods of the microservice and second data about the jobs being run on the pods of the microservice. It may be assumed that the first data is obtained from the microservice, e.g., via a query command, and that the second data is stored on the external job service. It may also be assumed that within the map, the first data at least initially maps to second data. In one preferred approach the first data may include an ID of the pod that a first of the jobs is being run on and/or a container thereof, and the second data may include an ID of the first job, e.g., a pod ID (PID). In order to determine whether the microservice of the second cluster has restarted it may be determined whether the mapping of the map has changed. For example, it may be determined whether third data about jobs being run on pods of the microservice maps to the second data, e.g., instead of the first data mapping to the second data. In such an example, the third data may be a different pod ID that now maps to the ID of the first job as a result of the microserver experiencing a failure event and restarting to recover from the failure event. This is because the restart may cause a pod and/or container thereof, that was being used prior to the microserver restarting, to be recycled and a new pod having a different pod ID and/or container thereof to be recruited for the first job after the restart is performed. In this case, the third data, e.g., the new pod ID, maps to the second data after the microserver is restarted. In response to a determination that third data about jobs being run on pods of the microservice maps to the second data, it may be determined that the microservice has restarted. In contrast, assuming that the microserver has not experienced a failure event and therefore has not restarted, the mapping is not updated. In response to a determination that the mapping has not been updated, e.g., the first data continues to map to second data, it may be determined that the microservice has not restarted.

Figure 3B:
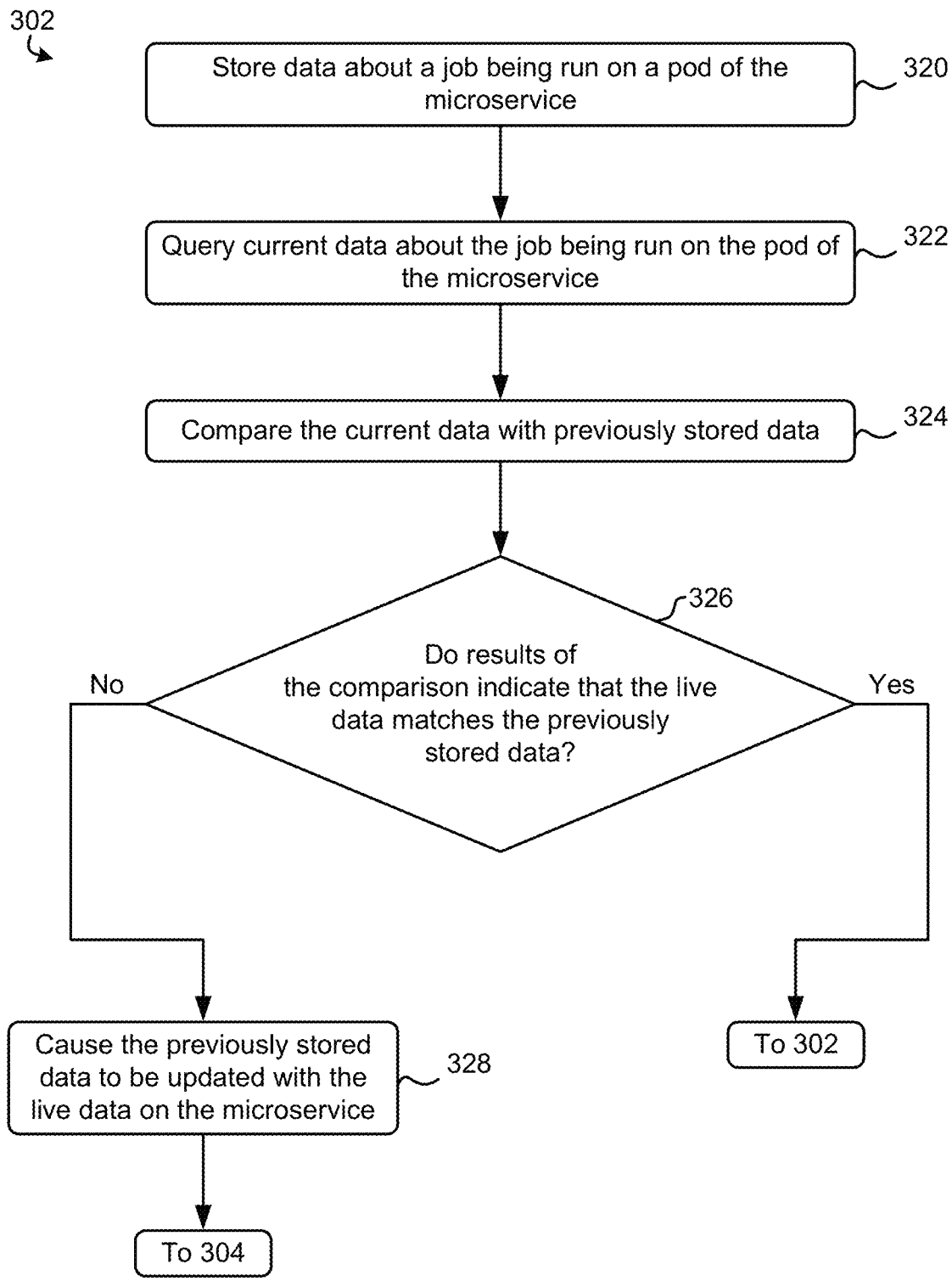
FIG. 3B is a flowchart of sub-operations of an operation of the flowchart of the method of FIG. 3A.

Data comparison techniques may additionally and/or alternatively be used to determine whether the microservice has restarted. Looking to FIG. 3B, exemplary sub-processes of determining whether the microservice of the second cluster has restarted are illustrated in accordance with one embodiment, one or more of which may be used to perform decision 302 of FIG. 3A. However, it should be noted that the sub-processes of FIG. 3B are illustrated in accordance with one embodiment which is in no way intended to limit the invention.

Sub-operation 320 includes storing data about a job being run on a pod of the microservice. The data about the job being run may include any one or more types of data metrics. For example, in some approaches the data may include an ID of the pod that the job is being run on and/or an ID of the job, e.g., a PID. In some other approaches the data may additionally and/or alternatively include a known type of pod metadata, e.g., a status of a predetermined aspect of a job being run on a pod of the microservice, a PID, a running status, a state of a process, memory consumed since a most recently performed determination of whether the microservice of the second cluster has restarted, memory consumed since data queried from the microservice was last compared with data previously stored on the external job service, memory consumed since a last reconciliation, a number of running threads, timestamps of various predetermined events within a predetermined execution cycle, and a degree of deviation from one or more predetermined semantics which may be specified by a user for a task that is being run, etc. In one preferred approach the data about the job is stored upon the job being initiated, e.g., an initial sample of data. The data about the job may be stored at any one or more locations, e.g., the nanoservice, the microservice, a cloud location, within memory associated with the external job service, etc.

Live data is queried from the microservice about the job being run on the pod of the microservice in sub-operation 322. Known querying techniques may be utilized to obtain the live data. The live data preferably is the same type of data as the data stored in sub-operation 320 (the data stored in sub-operation is hereafter referred to as "the previously stored data"). Furthermore, the live data is preferably associated with the previously stored data. For example, the live data and the previously stored data may, e.g., be both obtained from the microservice, be about the same job, be about data of different jobs performed on the same pod, etc. The live data may be queried at any time after the job has been initiated on the pod of the microservice. A comparison of the live data with previously stored data is performed to determine whether the microservice of the second cluster has restarted, e.g., see sub-operation 324. In some approaches the live data and the previously recorded data may be input to a predetermined Boolean logic operation to determine whether the microservice of the second cluster has restarted. In one preferred approach the comparison includes inputting the live data and the previously recorded data into an exclusive or logical operation (XOR). For context, a difference in the live data and the previously recorded data may indicate that the microservice of the second cluster has restarted. This is because such a restart may result in a job being run on different resources, e.g., a different pod, subsequent to the restart than the resources that the job was being run on before the restart.

It is determined whether results of the comparison indicate that the live data matches the previously stored data, e.g., see sub-operation 326. In some approaches, one or more known techniques for comparing data and/or analyzing results of a comparison may be utilized to determine whether the live data matches the previously stored data. It may be determined that the results of the comparison indicate that the live data matches the previously stored data (e.g., see "Yes" logical path of sub-operation 326) and the sub-processes may continue to decision 302. In some approaches, it may be determined that the microservice of the second cluster has not restarted in response to the live data matching the previously stored data. In contrast, in some approaches it may be determined that the results of the comparison indicate that the live data does not match the previously stored data (e.g., see "No" logical path of sub-operation 326) and the sub-processes may continue to operation 304. Sub-operation 328 includes optionally updating the previously stored data with the live data on the microservice, e.g., to reflect a current state of the microservice, in response to a determination that the results of the comparison indicate that the live data does not match the previously stored data. In some approaches, the previously stored data may be caused to be updated by issuing an instruction to the external job service, e.g., where the previously stored data is obtained from a job scheduler of the external job service. In other approaches, such an instruction may be made to any storage location that the previously stored data is stored at, e.g., such as a known type of container services location that the nanoservice is configured to query information from. A determination may be made that the microservice of the second cluster has restarted in response to results of the comparison indicating that the live data does not match the previously stored data. According to a more specific approach, assuming that the live data and the previously stored associated data are input to a XOR logical gate to determine whether a difference is present in the data, it may be determined that a difference is present in the data in response to determining that a logical output of the XOR gate is the value one. In such an approach, it may be determined that the microservice of the second cluster has restarted in response to the determination that the logical output of the XOR gate is the value one. It may additionally and/or alternatively be determined that a difference is not present in the data in response to determining that a logical output of the XOR gate is the value zero. In such an approach, it may be determined that the microservice of the second cluster has not restarted in response to the determination that the logical output of the XOR gate is the value zero.

With reference again to FIG. 3A, in response to a determination that the microservice of the second cluster has not restarted (e.g., as illustrated by the "No, restart has not occurred" logical path of decision 302) the method optionally returns to decision 302 until the microservice of the second cluster is determined to have restarted. In contrast, in some approaches in response to a determination that the microservice of the second cluster has restarted (e.g., as illustrated by the "Yes, restart has occurred" logical path of decision 302), the nanoservice is caused to inform an external job service about the restart of the microservice, e.g., see operation 304. By informing the external job service about the restart of the microservice, the external job service is informed of the status(es) of one or more jobs associated with the microservice. For example, assuming that a first job is associated with the microservice of the second cluster and assuming that that the microservice is determined to have restarted, the first job may be determined to no longer be in an "InProgress" state, not have reached a "Completed" state and be in a "Failure" state. The external job status is relayed this information as a result of being informed that the microservice has restarted. It should be noted that if the nanoservice was not caused to determine that the microservice restarted, the external job service may otherwise have not known a job status of the microservice and performance of at least the external job status would deteriorate.

The nanoservice may be caused to inform the external job service about the restart as a result of an instruction being issued to the external job service, e.g., by a controller that is in communication with the nanoservice, by the job scheduler, by an administrator device, etc. In one preferred approach the external job service may be informed of the live data. In another approach the external job service may be informed of microservice that has restarted in order to allow the external job service to identify a job associated with the microservice that has restarted. This will allow the external job service to reschedule the job in response to a determination that the job was not completed as a result of the microservice restarting.

Operation 306 includes causing a job associated with the microservice to be reset. More specifically, a job associated with the restart on the second cluster may in some approaches be caused to be reset. The job associated with the restart on the second cluster may be a job that was in progress when the microservice of the second cluster restarted. Accordingly, in some approaches the job associated with the restart on the second cluster may be a job being run on a pod of the microservice or is waiting to be run on a pod of the microservice, that was recycled as a result of a failure event occurring on the microservice and/or the restart of the microservice resulting therefrom. The job associated with the restart on the second cluster may additionally and/or alternatively be associated with the data compared to determine whether the microservice of the second cluster has restarted. Accordingly, in some approaches the job may be identified from a job ID and/or a unique ID-based hash thereof that is used in a comparison of data to determine whether the microservice of the second cluster has restarted.

In an alternate approach to the techniques described above that include using the nanoservice to act as an intermediator between the microservice and the external job service, in one approach, a polling mechanism may be kept inside the microservice. In this approach, a timer task may be kept in the microservice itself which checks for the job status in regular time intervals and resets the job if it is "In Progress" for a longer than a predetermined time interval. However, it should be noted that in such an approach, any failures in microservice may affect the timer task execution itself. Accordingly, other techniques described herein, e.g., see method 300 and/or method 500, for using a nanoservice to inform an external job service of a job status of a microservice minimize such drawbacks by keeping the polling mechanism in a separate cluster by keeping the microservice pod metadata within.

There are numerous benefits enabled as a result of utilizing the techniques of various embodiments and approaches described herein to use a nanoservice to inform an external job service of a job status of a microservice. For example, performance of a container orchestration system that includes the external job scheduler improves as a result of utilizing the techniques of various embodiments and approaches described herein. This is because the external job scheduler is informed upon a job failing to be completed as a result of a microservice restarting, rather than a microservice restart causing the external job scheduler to otherwise remain unaware of a status of a job. It should be noted that use of a nanoservice (that is in a different cluster than a microservice) to inform an external job service of a job status of a microservice has heretofore not been considered in conventional applications. Instead, such conventional applications rely and wait on a microservice to update job statuses. Accordingly, the inventive discoveries disclosed herein with regards to use of nanoservice (that is in a different cluster than a microservice) to inform an external job service of a job status of a microservice proceed contrary to conventional wisdom.

Figure 4:
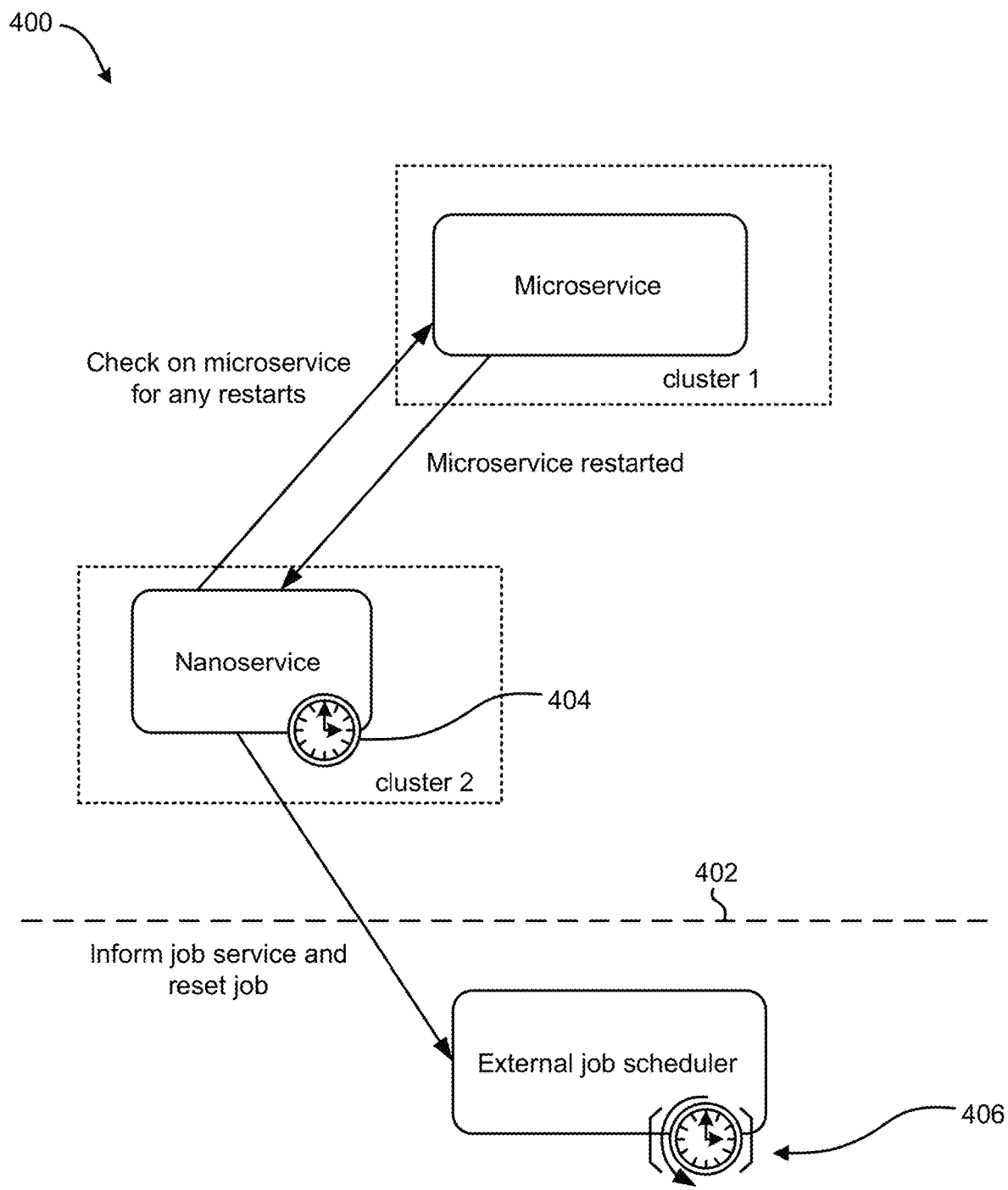
FIG. 4 is a depiction of a system architecture, in accordance with one embodiment.

FIG. 4 depicts a system architecture 400, in accordance with one embodiment. As an option, the present system architecture 400 may be implemented in conjunction with features from any other embodiment listed herein, such as those described with reference to the other FIGS. Of course, however, such system architecture 400 and others presented herein may be used in various applications and/or in permutations which may or may not be specifically described in the illustrative embodiments listed herein. Further, the system architecture 400 presented herein may be used in any desired environment.

System architecture 400 includes an external job scheduler that is an external service, e.g., where the service being external is represented by the dashed line 402. System based hardware and/or software of system architecture 400 may be configured to execute in tandem with the external job scheduler acting as a central point for controlling different jobs in a distributed manner. The system architecture 400 further includes a microservice in a first cluster, e.g., see cluster 1, and a nanoservice in a second cluster, e.g., see cluster 2, wherein the first cluster and the second cluster are not the same cluster. In some approaches, the external job service is preferably not in the first cluster and is preferably not in the second cluster. The nanoservice may be configured to act as an intermediator between the external job service and the microservice in order to handle failure scenarios that the microservice may otherwise not be able to indicate the external job service. For example, the nanoservice may be caused to determine whether the microservice has restarted, e.g., see Check on microservice for any restarts. In one approach, the nanoservice may be caused to periodically determine whether the microservice has restarted, e.g., according to a timer task 404 of the nanoservice which may be synced with a clock 406 of the external job scheduler. In response to a determination that the microservice has restarted, e.g., see Microservice restarted, the nanoservice may be caused to inform the external job service about the restart of the microservice and a job associated with the restart may be reset, e.g., see Inform job service and reset job.

Figure 5:
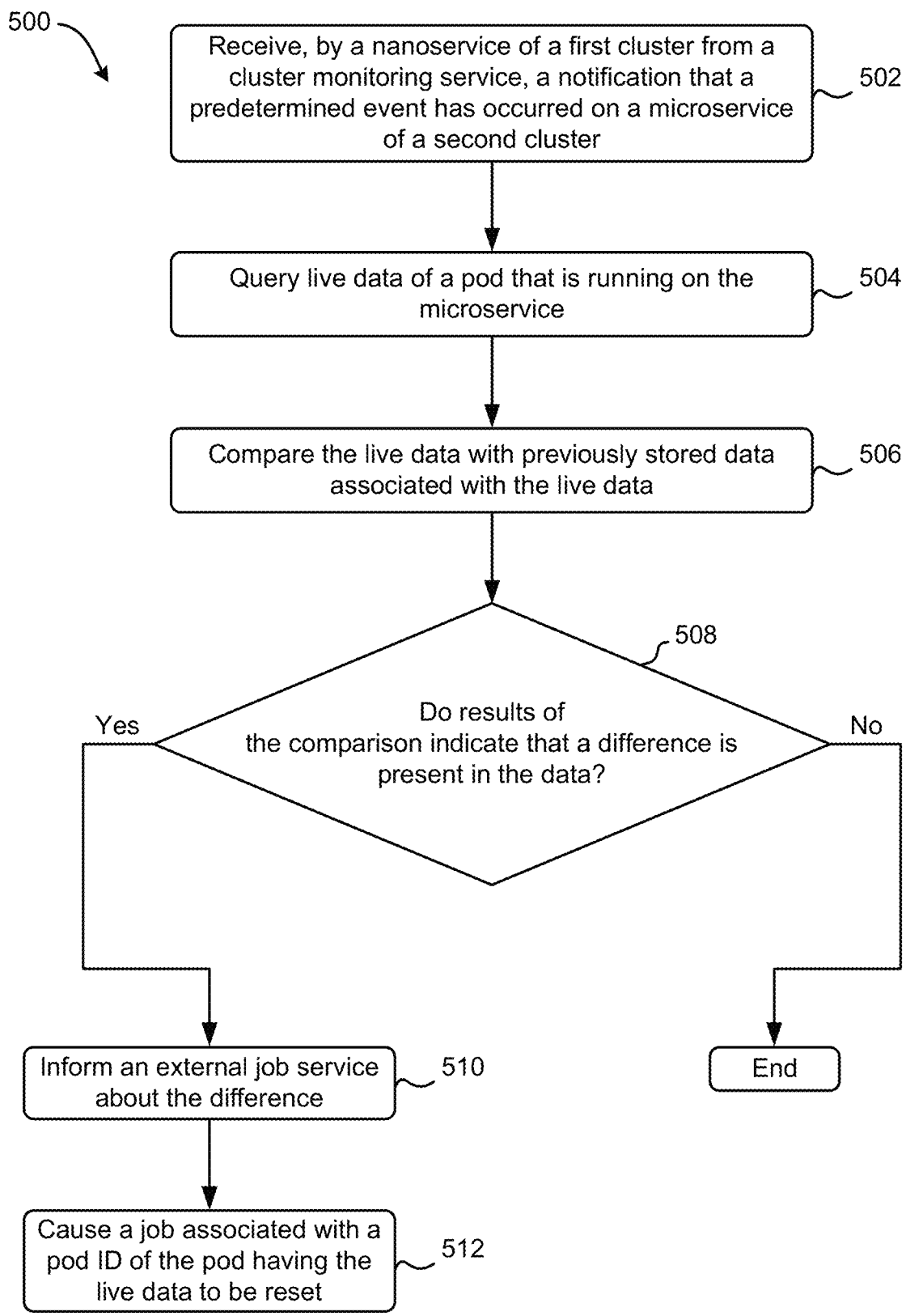
FIG. 5 is a flowchart of a method, in accordance with one embodiment.

Now referring to FIG. 5, a flowchart of a method 500 is shown according to one embodiment. The method 500 may be performed in accordance with the present invention in any of the environments depicted in FIGS. 1-7, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

For context it may be prefaced that method 500 includes making use of an event notification system for a general pod lifecycle. Method 500 specifically includes use of a job scheduler that is an external service. Furthermore, a microservice of a cluster is utilized as well as a nanoservice that is in a different cluster than the microservice. As will be described in method 300, the nanoservice may be in a first cluster and the microservice may be in a second cluster that is different than the first cluster. The external job service is preferably not in the first cluster and is preferably not in the second cluster. In contrast to method 300 in which a nanoservice acts as an intermediator between the external job service and the microservice, method 500 make use of a cluster monitoring service that has an overarching view of all worker nodes in a cluster instead of having a timer task in the nanoservice. As will be described below, the cluster monitoring service is configured to notify the nanoservice whenever cluster having the microservice goes down and/or any other events which are capable of triggering a task of resetting the jobs associated to the pods in the cluster having the microservice.

Operation 502 includes receiving, by the nanoservice of the first cluster, a notification, e.g., a callback, that a predetermined event has occurred on the microservice of the second cluster. The notification is in some approaches received from the cluster monitoring service which is preferably configured to monitor the microservice of the second cluster while the nanoservice is in a dormant state. Accordingly, the cluster monitoring service acts as a job supervisor for the nanoservice. In one or more of such approaches, the cluster monitoring service may be of a known type and the nanoservice may receive such notifications as a result of the nanoservice being registered for callback(s) from the service. However, in some other approaches, the notification may be received from any source that serves as a relay based on being in communication with the cluster monitoring service and the nanoservice.

The predetermined event may be any predetermined type of cluster level activity. These activities preferably include a type of event that is capable of triggering a task of resetting the jobs associated to the pods in the cluster having the microservice. For example, in one approach the predetermined event may include one or more nodes of the second cluster failing subsequent to a job being initiated and before the job is completed. In another approach the event may include the microservice becoming unavailable as soon as a job is triggered and/or or the microservice undergoing a restart during a job execution where the job status remains "InProgress" as a result. Another event may include data being backed up during a job execution and the data being imported to the cloud instance. In another approach the predetermined event may additionally and/or alternatively include the microservice of the second cluster at least temporarily losing functionality, e.g., going down. In another approach, the predetermined event may include the second cluster failing subsequent to a job being initiated and before the job is completed. In another approach, the predetermined event may include detection of live metadata associated with a job being run on the second cluster exceeding one or more predetermined thresholds. In yet another approach, the approach the predetermined event may include one or more pods and/or containers being unresponsive, crashing, down, being created, having a status change, etc.

In response to receiving the notification, a predetermined process, e.g., see operations 504-512, may be performed to ensure fulfillment of one or more jobs that may have been reset as a result of the predetermined event occurring.

Operation 504 includes querying live data of a pod that is running on the microservice, e.g., pod metadata. In some approaches, the live data includes a name of a pod, such as the name of a pod associated with a job that has been reset. In another approach, the live data includes a pod ID of a pod that a job that has been reset is associated with. In some other approaches live data may additionally and/or alternatively include a container name, a status, a service, a node, etc. Note that, although operation 504 specifies querying the live data, in some approaches the live data may additionally and/or alternatively be included and identified in the notification received by the nanoservice, e.g., such as where the notification is received as a part of a reconciliation.

Data associated with the live data, e.g., data containing jobs triggered by a previous cluster, may have been previously stored at a predetermined location, e.g., the nanoservice, the microservice, a cloud location, within memory associated with the external job service, a database detached from the system, etc. The previously stored data may one approach be pod data of a pod, e.g., a first pod, that is running on the microservice, e.g., currently running after the predetermined event has occurred. In such an approach the previously stored data may have been stored upon a job beginning to run on the first pod. Having the previously stored data be pod metadata about one or more jobs being run on the microservice ensures that, in the event that a predetermined event occurs, a reference of data that existed prior to the predetermined event is available, e.g., see operation 506. In some approaches the previously stored data may be queried using information of the job scheduler. For example, in one approach, in response to receiving the notification, a list of the job scheduler may be referenced to determine a name of a pod associated with the predetermined event occurring.

In operation 506 the live data may be compared with previously stored associated data to determine whether a difference is present. Accordingly, in one preferred approach, the live data is of a same type of data as the previously stored data. This allows an old status to be compared with a new status. A difference in the live data and the previously stored data may indicate that a job has been reset as a result of the predetermined event occurring. This is because the predetermined event may cause a pod and/or container thereof, that was being used prior to the microserver restarting, to be recycled and a new pod having a different pod ID and/or container thereof to be recruited. The recruited pod may be used to again initiate the job.

It should be noted that although the above example specifies querying and comparing a single sample of live data with a single sample of previously stored data, in some approaches scaling may be applied to include querying and comparing live data of each of a plurality of pods that are running on the microservice with previously stored associated data to determine whether one or more differences are present in the data. Similarly, although in some approaches the live data and the previously stored data may include a single type of data, in some other approaches, a plurality of different types of metrics of the live data are each compared with an associated metric of the previously stored associated data to determine whether the difference is present.

One or more techniques described elsewhere herein for comparing data may be used to compare the live data with the previously stored data in method 500. For example, in one approach the live data and the previously stored associated data are input to a XOR logical gate to determine whether a difference is present in the data. In such an approach, it may be determined that a difference is present in the data in response to determining that a logical output of the XOR gate is the value one. In contrast, it may be determined that a difference is not present in the data in response to determining that a logical output of the XOR gate is the value zero.

In some approaches, predetermined degrees of tolerance may be incorporated into the comparison. For example, in one approach a difference is determined to be present in the data where at least one of the compared associated metrics are determined to be different to any detectable degree, e.g., more than a predetermined negligible amount. In another approach in which a plurality of metrics of the live data are compared with a plurality of associated metrics of the previously stored data, a difference is determined to be present in the data where a predetermined threshold number of the compared associated metrics are determined to be different. In another approach in which a plurality of metrics of the live data are compared with a plurality of associated metrics of the previously stored data, a difference is determined to be present in the data where each of the compared associated metrics are determined to be different. In contrast, for an approach in which a plurality of metrics of the live data are compared with a plurality of associated metrics of the previously stored data, a difference is determined to be present in the data where at least a predetermined threshold of the compared associated metrics are determined to be different.

In response to a determination that a difference is not present in the data (e.g., as illustrated by the "No" logical path of decision 508), the method may end, e.g., see End. It should be noted that although the "No" logical path of decision continues to "End" one or more operations of method 500 may continue to be performed in order to ensure that the external job service continues to remain informed of job status(es) of the microservice.

In response to a determination that a difference is present in the data (e.g., as illustrated by the "Yes" logical path of decision 508), the external job service may be informed of the difference in the data and/or the occurrence of the predetermined event, e.g., see operation 510. In one preferred approach, the external job service is informed by the nanoservice.

Operation 512 includes causing a job associated a pod ID of the pod having the live data of the micro service of the second cluster to be reset. Resetting this job prevents the predetermined event from causing a job to remain unfulfilled.

There are numerous benefits enabled as a result of utilizing the techniques of various embodiments and approaches described herein to use a nanoservice to inform an external job service of a job status of a microservice. For example, performance of a container orchestration system that includes the external job scheduler improves as a result of utilizing the techniques of various embodiments and approaches described herein. This is because the external job scheduler is informed upon a job failing to be completed as a result of a predetermined event occurring, rather than predetermined event causing the external job scheduler to otherwise remain unaware of a status of a job. It should be noted that use of a cluster monitoring service that notifies a nanoservice upon a predetermined event occurring has heretofore not been considered in conventional applications. Instead, such conventional applications rely and wait on the microservice itself to update job statuses. Accordingly, the inventive discoveries disclosed herein with regards to use of a cluster monitoring service and nanoservice to inform an external job service of a job status of a microservice proceed contrary to conventional wisdom.

Figure 6:
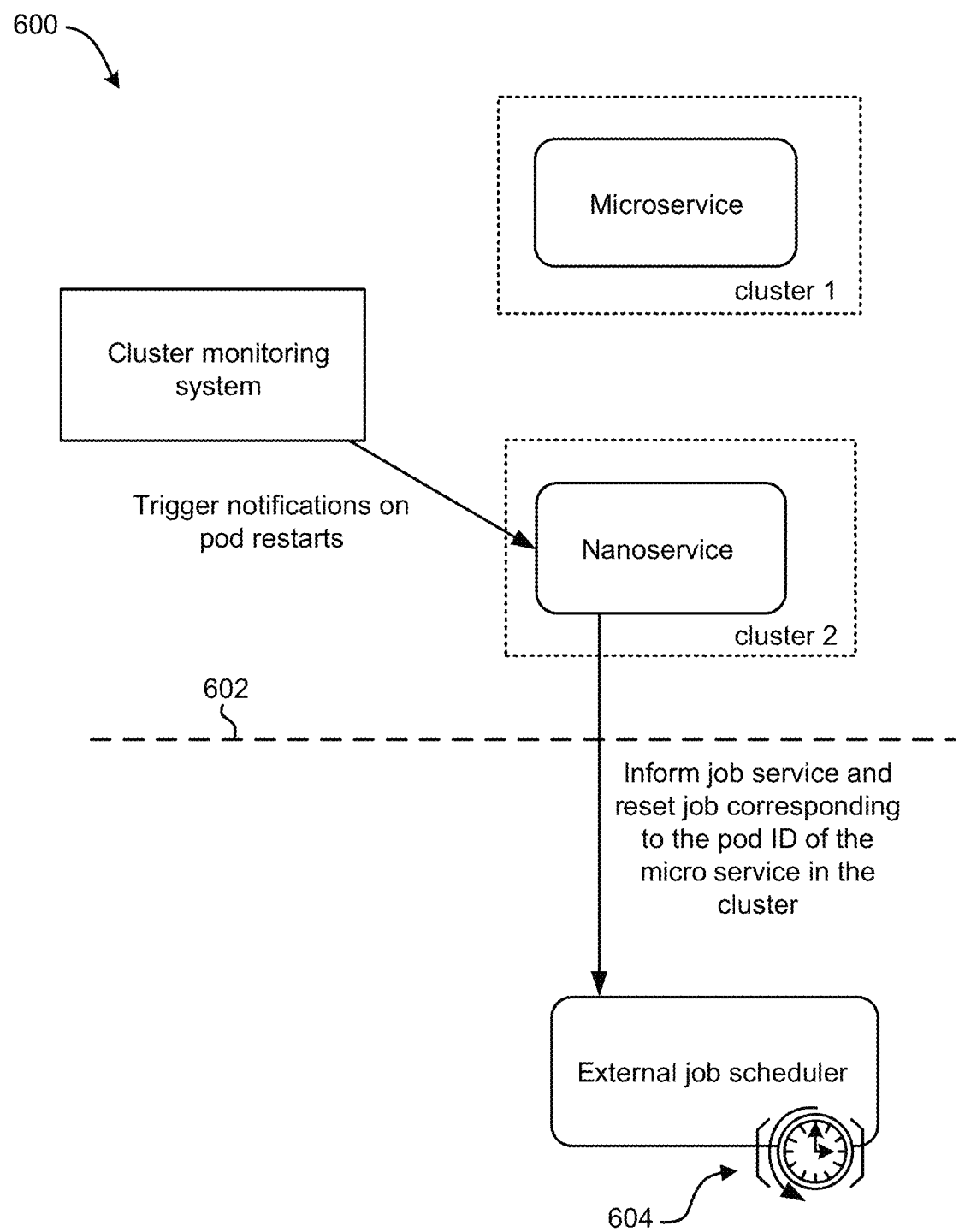
FIG. 6 is a depiction of a system architecture, in accordance with one embodiment.

FIG. 6 depicts a system architecture 600, in accordance with one embodiment. As an option, the present system architecture 600 may be implemented in conjunction with features from any other embodiment listed herein, such as those described with reference to the other FIGS. Of course, however, such system architecture 600 and others presented herein may be used in various applications and/or in permutations which may or may not be specifically described in the illustrative embodiments listed herein. Further, the system architecture 600 presented herein may be used in any desired environment.

System architecture 600 includes an external job scheduler that is an external service, e.g., where the service being external is represented by the dashed line 602. The system architecture 600 further includes a microservice in a first cluster, e.g., see cluster 1, and a nanoservice in a second cluster, e.g., see cluster 2, wherein the first cluster and the second cluster are not the same cluster. In some approaches, the external job service is preferably not in the first cluster and is preferably not in the second cluster.

System architecture 600 makes use of the cluster monitoring service instead of having a timer task in the nanoservice. A clock 604 of the external job scheduler is independent of the nanoservice and may be used by the external job scheduler to operate at regular predetermined intervals. The cluster monitoring service notifies the nanoservice whenever a predetermined event occurs, e.g., a cluster goes down and/or any other events which may trigger the task of resetting one or more jobs associated with the pods in the cluster, e.g., see Trigger notifications on pod restarts. The cluster monitoring service may additionally provide live data of pods that are running in the microservice. In response to receiving a notification that a predetermined event has occurred, a predetermined process may be performed. For example, live data of a pod that is running on the microservice may be compared with previously stored associated data to determine whether a difference is present. In response to a determination that a difference is present in the data, the external job service is informed about the difference and a job associated with a pod ID of the pod having the live data is caused to be reset, e.g., see Inform job service and reset job corresponding to the pod ID of the micro service in the cluster.

Figure 7:
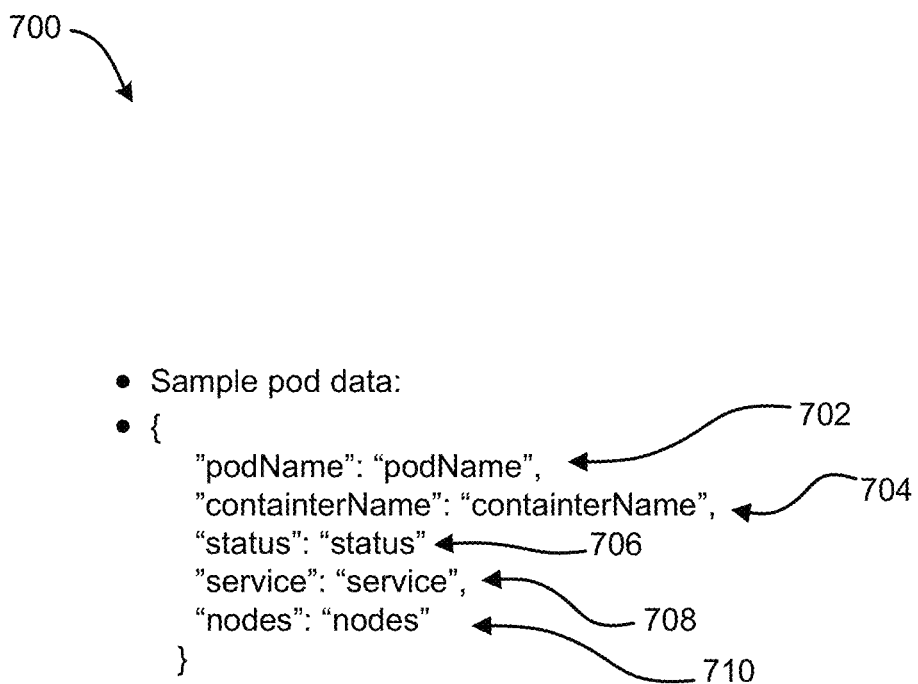
FIG. 7 a sample of live data of a pod that is running on a microservice, in accordance with one embodiment.

FIG. 7 depicts a sample of live data 700 of a pod that is running on a microservice, in accordance with one embodiment. As an option, the sample of live data 700 may be implemented in conjunction with features from any other embodiment listed herein, such as those described with reference to the other FIGS. Of course, however, such sample of live data 700 and others presented herein may be used in various applications and/or in permutations which may or may not be specifically described in the illustrative embodiments listed herein. Further, the sample of live data 700 presented herein may be used in any desired environment.

The sample of live data 700 of the pod that is running on the microservice includes a plurality of different types of metrics that may each be compared with an associated metric of previously stored associated data. For example, the sample of live data 700 includes a first metric 702 that includes a name of a pod. The sample of live data 700 also includes a second metric 704 that includes a container name, and a third metric 706 that includes a status of a job. The sample of live data 700 also includes a fourth metric 708 that includes a service, and a fifth metric 710 that includes a node.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, using a nanoservice in a first cluster of a system architecture, whether a microservice of a second cluster of the system architecture, that is different than the first cluster, has restarted; and
   in response to a determination that the microservice has restarted:
      informing an external job scheduler of the system architecture about the restart of the microservice, and
      causing a job associated with the microservice to be reset,
      wherein the use of the nanoservice of the first cluster results in the job associated with the microservice being completed in relatively less time than the job would otherwise be completed by relying on a job status of the microservice to complete the job associated with the microservice.

2. The computer-implemented method of claim 1, wherein the nanoservice periodically determines whether the microservice of the second cluster has restarted, wherein the determination is based on a clock of the external job scheduler, wherein the external job scheduler is not included in the first cluster, wherein the external job scheduler is not included in the second cluster.

3. The computer-implemented method of claim 1, comprising: keeping a map, wherein the map includes first data about jobs being run on pods of the microservice that maps to second data about the jobs being run on the pods of the microservice; and in response to a determination that third data about jobs being run on the pods of the microservice maps to the second data, determining that the microservice has restarted.

4. The computer-implemented method of claim 3, wherein the first data includes an ID of the pod that a first job is being run on, wherein the second data includes an ID of the first job, wherein a result of the causing the job associated with the microservice to be reset includes prevention of the job from otherwise remaining unfulfilled.

5. The computer-implemented method of claim 1, wherein determining whether the microservice of the second cluster has restarted includes: querying live data from the microservice about a first job being run on a pod of the microservice, and performing a comparison of the live data with previously stored data about the first job to determine whether the microservice of the second cluster has restarted, wherein the microservice of the second cluster is determined to have restarted in response to results of the comparison indicating that the live data does not match the previously stored data.

6. The computer-implemented method of claim 5, comprising: determining that the microservice of the second cluster has restarted, wherein the job associated with the microservice is the first job; and causing the previously stored data to be updated with the live data on the microservice.

7. The computer-implemented method of claim 5, wherein the data includes metadata selected from the group consisting of: a status of a predetermined aspect of a job being run on a pod of the microservice, pod IDs (PIDs), a running status, a state of a process, memory consumed since a most recently performed determination of whether the microservice of the second cluster has restarted, memory consumed since data on the microservice was last compared with data on the external job scheduler, a number of running threads, timestamps of various predetermined events within a predetermined execution cycle, and a degree of deviation from one or more predetermined semantics.

8. A computer-implemented method, comprising:
receiving, by a nanoservice of a first cluster of a system architecture, a notification that a predetermined event has occurred on a microservice of a second cluster of the system architecture, that is different than the first cluster,
wherein the notification is received from a cluster monitoring service; and
in response to receiving the notification, performing a predetermined process including:
comparing live data of a pod that is running on the microservice with previously stored data associated with the live data to determine whether a difference is present,
in response to a determination that a difference is present in the data:
informing an scheduler of the system architecture about the difference, and
causing a job associated with a pod ID of the pod having the live data to be reset,
wherein the performance of the predetermined process results in the job being completed in relatively less time than the job would otherwise be completed by relying on a job status of the microservice to complete the job associated with the microservice.

9. The computer-implemented method of claim 8, wherein the live data and the previously stored data are input to a XOR logical gate to determine whether a difference is present in the data, wherein a difference is determined to be present in the data in response to determining that a logical output of the XOR gate is a value of one, wherein a difference is determined to not be present in the data in response to determining that a logical output of the XOR gate is a value of zero.

10. The computer-implemented method of claim 8, wherein the notification includes the live data, wherein the live data includes metadata selected from the group consisting of: a name of a pod, a pod ID, a container name, a status, a service, and a node.

11. The computer-implemented method of claim 8, wherein the predetermined event includes the microservice of the second cluster losing functionality.

12. The computer-implemented method of claim 8, wherein a plurality of different types of metrics of the live data are compared with an associated metric of the previously stored data to determine whether the difference is present.

13. The computer-implemented method of claim 8, wherein the process includes comparing live data of a plurality of pods that are running on the microservice with previously stored data to determine whether a difference is present in the data.

14. The computer-implemented method of claim 8, wherein the previously stored data is pod data of the pod that is running on the microservice, wherein the previously stored data was stored upon a job beginning to run on the pod that is running.

15. A computer program product, the computer program product comprising a computer readable storage medium having program instructions embodied therewith, the program instructions readable and/or executable by a computer to cause the computer to:
determine, by the computer, using a nanoservice in a first cluster of a system architecture, whether a microservice of a second cluster of the system architecture, that is different than the first cluster, has restarted; and
in response to a determination that the microservice has restarted:
inform, by the computer, an external job scheduler of the system architecture about the restart of the microservice, and
cause, by the computer, a job associated with the microservice to be reset,
wherein the use of the nanoservice of the first cluster results in the job associated with the microservice being completed in relatively less time than the job would otherwise be completed by relying on a job status of the microservice to complete the job associated with the microservice.

16. The computer program product of claim 15, wherein the nanoservice periodically determines whether the microservice of the second cluster has restarted, wherein the determination is based on a clock of the external job scheduler, wherein the external job scheduler is not included in the first cluster, wherein the external job scheduler is not included in the second cluster.

17. The computer program product of claim 15, the program instructions readable and/or executable by the computer to cause the computer to:
keep, by the computer, a map, wherein the map includes first data about jobs being run on pods of the microservice that maps to second data about the jobs being run on the pods of the microservice; and
in response to a determination that third data about jobs being run on the pods of the microservice maps to the second data, determine, by the computer, that the microservice has restarted.

18. The computer program product of claim 17, wherein the first data includes an ID of the pod that a first job is being run on, wherein the second data includes an ID of the first job, wherein a result of the causing the job associated with the microservice to be reset includes prevention of the job from otherwise remaining unfulfilled.

19. The computer program product of claim 15, wherein determining whether the microservice of the second cluster has restarted includes: querying live data from the microservice about a first job being run on a pod of the microservice, and performing a comparison of the live data with previously stored data about the first job to determine whether the microservice of the second cluster has restarted, wherein the microservice of the second cluster is determined to have restarted in response to results of the comparison indicating that the live data does not match the previously stored data.

20. The computer program product of claim 19, the program instructions readable and/or executable by the computer to cause the computer to:
determine, by the computer, that the microservice of the second cluster has restarted, wherein the job associated with the microservice is the first job; and cause, by the computer, the previously stored data to be updated with the live data on the microservice.

* * * * *